Patented June 18, 1940

2,205,032

UNITED STATES PATENT OFFICE 2,205,032

DYE COMPOSITIONS

Ivan F. Chambers, Wilmington, Del., and Arthur L. Fox, Woodstown, N. J., assignors to E. I. du Pont de Nemours & Company, Wilmington, Del., a corporation of Delaware No Drawing. Application March 17, 1937, Serial No. 131,450

15 Claims. (Cl. 8—34)

This invention relates to improved processes for printing textile fibers with vat dyes and to dye compositions which are especially adapted for that purpose. More particularly it relates to the preparation of printing compositions containing a vat dye and a material adapted to facilitate the penetration of the dye during a printing operation. Still more particularly it relates to applying to a fabric composed of natural or synthetic or mixed fibers a printing composition containing a vat dye and a penetrating agent. Still more particularly it relates to printing pastes or powders containing as penetrating agents acid esters of aromatic polycarboxylic acids and the water-soluble salts thereof. It further relates to printing processes and fabrics dyed with the printing vat dye compositions containing our improved penetrating agents.

By the term "vat dye" hereinafter we refer to dyes of the anthraquinone, indigo, thioindigo and sulfur series which are capable of being reduced by the aid of alkaline hydrosulfite.

The printing of fabric with vat colors is a well known and highly developed art. It generally comprises dispersing the vat color in a thickening paste containing reducing agents, applying to the fabric by means of an engraved roller, then exposing the fabric to the action of steam which is known as "aging," to effect reduction of the color, and finally treating with a mild oxidizing agent and washing and soaping to remove the gum, unfixed color, etc.

Processes are also known which employ stabilized water-soluble forms of vat dyes, such as the leuco esters of vat dyes, known as "Indigosol" colors. These colors are water-soluble and require no reducing agent. Application consists in impregnating the fabric with the color and fixing the dye on the fiber by subsequent hydrolysis and oxidation.

In either case, special assistants are generally added to the dye composition or printing paste to facilitate the dispersion of the dye, penetration, reduction, oxidation, etc. The state of perfection has not yet been attained, and the printer generally has to cope with such problems as poor penetration of the color into the fiber, low tinctorial yield, lack of brilliancy in the prints, specky or mottled prints, the latter especially on heavily delustered rayon. He is also quite restricted in the conditions of operations, and will frequently obtain inferior results if the aging time is curtailed or if the percentage of reducing agent in the printing composition is appreciably reduced. In printing with water-soluble forms of the vat dyes, the additional problem enters of obtaining deep shades. Light shades are, as a rule, obtained readily with leuco esters but only a few of the latter have sufficient solubility and penetrating power to produce a satisfactory deep shade.

It is an object of this invention to provide improved vat dye compositions which have good penetration properties. It is a further object to provide a process for printing with vat dyes which is characterized by the production of uniform prints, free from speckiness, and of good penetration. It is a still further object to provide printing pastes or powders which are particularly adapted for the aforementioned processes. It is a still further object of this invention to produce novel vat dye compositions which possess good wetting, penetrating and dispersing power, and permit of efficient utilization of the color. A still further object of this invention is to provide novel vat dye powders which are essentially nonhygroscopic and which possess good wetting, penetrating and dispersing power. A still further object is to produce prints of exceptional strength, brilliancy, penetration on natural and particularly on lustrous and delustered regenerated cellulose fibers. Another object is to produce dyeings of exceptional levelness, penetration, strength and brilliancy by the pigment-pad method or by continuous or intermittent machine method. Other and further objects of this invention will appear hereinafter.

These and other objects are accomplished by incorporating into a vat dye composition a penetrating agent having the following general formula:

$$(R_1OOC)_nR(COOM)_n$$

wherein R is an aromatic hydrocarbon radical, $R_1$ is a hydrocarbon radical, M is hydrogen or a water-soluble salt-forming group, and $n$ is an integer from 1 to 3. R and $R_1$ may contain nonfunctioning substituents such as hydrocarbon, halogen, hydroxyl and alkoxy groups. Thus R may be a benzene, naphthalene, hydrobenzene or hydronaphthalene nucleus, and $R_1$ may be alkyl, alkenyl, aralkyl or aryl radical. M may be hydrogen, alkali metal, alkaline earth metal, ammonium or an amine group.

In a more limited and preferred embodiment of the invention, they are accomplished by incorporating into a vat dye composition for printing a penetrating agent having the formula:

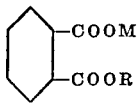

wherein R is an alkyl, alkenyl or aralkyl radical, and M is alkali metal, alkaline earth metal, ammonium or an amine group. Mixtures of penetrating agents coming under the above formula may be used.

In the aforementioned limited and preferred embodiment of the invention wherein R represents an alkyl radical, the alkyl radical preferably should contain not more than twelve carbon atoms. Best results are obtained when the alkyl radicals contain from four to eight carbon atoms. The alkyl radicals may be straight or branch chain. Excellent results are obtained when the alkyl radical is normal butyl or when it represents the branched chain alkyl sulfates having from six to eight carbon atoms, especially homologous mixtures such as those obtainable by reacting the higher alcohol mixture or fractions thereof obtainable from the methanol synthesis from carbon monoxide and hydrogen. Such mixtures also contain substantial amounts of straight chain radicals. Benzyl acid phthalates likewise have a surprising superiority which may be due to the fact that it contains seven carbon atoms and is connected to the phthalic acid nucleus by means of an acyclic carbon atom.

This invention will be further illustrated but is not limited by the following examples in which the parts are by weight.

In these examples we shall use, for the purpose of comparison, three types of thickening pastes to which we shall refer, respectively, as thickener A, B and C, each containing as a common basic ingredient a starch-British-gum paste hereinafter designated as thickening SBG.

*Example I*

This example illustrates the preparation of various thickening pastes.

Thickening SBG:
    100 parts of wheat starch and
    300 parts of British gum were pasted with
    600 parts of water 1000 parts.

This mixture was heated to the boil for ten minutes and cooled to room temperature. A smooth paste was obtained.

Thickener A:
    560 parts of thickening SBG were heated to 170° F. There were then added
    170 parts of potassium carbonate. After the potassium carbonate had dissolved, the paste was cooled to 140° F. and the following ingredients added:
    120 parts of sodium formaldehyde sulfoxylate
    50 parts of glycerin
    100 parts of water 1000 parts.

The whole was then stirred to form a smooth paste.

Thickener B:
    550 parts of thickening SBG
    50 parts of potassium carbonate
    250 parts of caustic soda (35% solution)
    150 parts of glucose 1000 parts.

Thickener C:
    520 parts of thickening SBG were heated to 170° F. There were then added
    200 parts of potassium carbonate. The paste was cooled to 140° F. and the following ingredients added:
    180 parts of sodium formaldehyde sulfoxylate
    50 parts of glycerin
    50 parts of water 1000 parts.

The whole was agitated to form a smooth paste.

*Example II*

10 parts of "Sulfanthrene" Brown G Paste were mixed with
42 parts of thickening SBG. To this were added
5 parts of glycerin
8 parts of caustic soda (35%)
10 parts of potash
10 parts of glucose and
15 parts of benzyl acid phthalate sodium salt 100 parts.

Cotton and rayon piece goods were printed with the above printing composition, dried and aged for five minutes at 214° F. in a rapid ager of the Mather Platt type. The printed material was then treated for one minute in an oxidizing bath at 140° F. containing 0.5% of sodium bichromate and 0.5% of acetic acid, rinsed in cold water, soaped for five minutes in a soap bath at 160° F. containing 0.5% of soap, rinsed and dried. A brilliant brown dyeing was obtained which showed excellent color value and exceptionally good penetration on rayon. Instead of the benzyl acid phthalate sodium salt above used, benzyl acid phthalate triethanolamine salt may be used with equally good or better results. The benzyl acid phthalate sodium salt was prepared as follows:

Fifty-four grams of benzyl alcohol and 74 grams of phthalic anhydride were heated to 120° C. with agitation. After the phthalic anhydride dissolved, it was heated on a steam bath thirty minutes and then poured into 100 cc. 5 N-sodium hydroxide. Two hundred cc. of water were added and it was steam distilled. After the steam distillation, the residue was acidified and the light-colored oil separated and neutralized (a) with sodium hydroxide, (b) with triethanolamine, and dried.

*Example III*

20 parts of "Sulfanthrene" Orange R Paste (Color Index #1217) were mixed with
75 parts of thickener A. To this were added
5 parts of sodium normal butyl phthalate 100 parts.

Lustrous and titanium dioxide delustered viscose and cellulose acetate rayon piece goods were printed with the above printing composition, aged, and developed as in Example II. Bright orange prints of exceptional levelness and penetration were obtained.

In the above example, the dyestuff may be replaced by any other vat dye of the indigoid, thioindigoid or anthraquinone series, as for instance, "Ponsol" Dark Blue BR Paste (Color Index #1099), "Sulfanthrene" Blue 2BD Double Paste (Color Index #1184), "Sulfanthrene" Pink FF Paste (Color Index #1211), "Sulfanthrene" Violet B Double Paste (Color Index #1222), "Ponsol" Yellow G Double Paste (Color Index #1118), "Sulfanthrene" Yellow R Paste (Color Index #1170), "Ponsol" Brown AR Double Paste (Color Index #1151), "Ponsol" Blue GD Double Paste (Color Index #1113), "Ponsol" Golden Orange G Double Paste (Color Index #1096), "Ponsol" Flavone GC Paste (Color Index #1095), "Ponsol" Blue BCS Double Paste (Color Index #1114), "Ponsol" Jade Green Paste (Color Index #1101), and many others.

*Example IV*

20 parts of "Ponsol" Jade Green Paste (Color Index #1101) were mixed with
70 parts of thickener C. To this were added
4 parts of sodium isopropyl phthalate and
6 parts of Turkey red oil 100 parts.

Lustrous and ethylene glycol di-beta-naphthyl ether delustered rayon piece goods were printed with the above printing composition, dried, aged, and developed as in Example II. A bright green print of exceptional uniformity and penetration was obtained.

*Example V*

10 parts of "Sulfanthrene" Brown G Paste (or Ciba Brown G Paste) were mixed with
65 parts of thickener A and
15 parts of thickening SBG. To this were added
10 parts of a stable emulsion consisting of 100 parts.  60 parts of Turkey red oil
         40 parts of assistant A 100 parts.

Assistant A consists of a 30% aqueous solution of mixed sodium alkyl phthalates which may be obtained by the esterification of a mixture of $C_6$ primary and $C_7$ secondary monohydric alcohols (B. P. 133°–150° C.) with phthalic anhydride. The phthalate mixture may be prepared according to the following procedure:

250 grams of a mixture of $C_6$ primary and $C_7$ secondary monohydric alcohols (B. P. 133.5°–150° C.) obtained from the methanol synthesis by the reaction between CO and hydrogen, were mixed with
148 grams of phthalic anhydride 398 grams.

Heated to 110° C. for one hour with stirring, cooled to room temperature and added 100 cc. of water and 103 cc. of 10N. NaOH, the solution becoming slightly alkaline to Brilliant Yellow. The solution was then steam distilled removing the excess alcohol. The residue was then evaporated on a steam bath to a small volume and filtered, the small quantity of filtrate being discarded. The residue consisting of a mixture of sodium alkyl phthalates was employed for the tests.

Piece goods containing cotton, lustrous rayon and titanium dioxide delustered rayon were printed with the above printing composition, dried, aged for two and one-half minutes at 214° F., and developed as in Example II. Although the aging time was curtailed, a bright brown print of exceptional strength, brilliancy and penetration to the reverse side of the fabric was obtained.

In the above example, assistant A may be substituted with equally good results by 30% solutions of the following alkyl phthalates:

(a) Mixed alkyl phthalates obtained by the esterification of a mixture of $C_7$ primary and $C_8$ secondary alcohols (B. P. 150°–160° C.);

(b) Mixed alkyl phthalates obtained by the esterification of a mixture of $C_8$ to $C_{10}$ primary and secondary alcohols (B. P. 160°–200° C.);

(c) Mixed alkyl phthalates obtained by the esterification of a mixture of $C_{10}$ and above, primary and secondary alcohols (B. P. 200°–260° C.).

*Example VI*

15 parts of "Sulfanthrene" Blue 2BD Double Paste (Color Index #1184) were mixed with
60 parts of thickener A as prepared in Example I
14 parts of thickening SBG
3 parts of sodium hydrosulfite and
8 parts of a stable emulsion consisting of 100 parts.  25 parts of isopropyl naphthalene sodium sulfonate
         60 parts of water
         15 parts of ethanolamine salt of 2-ethylbutyl phthalate
         100 parts.

The printing paste was heated to 140° F. during which the color was reduced to a considerable extent, and then cooled to room temperature. Piece goods containing viscose rayon, Bemberg rayon, cellulose acetate rayon and titanium dioxide delustered rayon fibers were printed with the above printing composition, dried and aged for five minutes at 218° F. After aging, the print was immersed for two minutes in a bath at 130° F. containing 0.5% of sodium perborate and 0.5% of acetic acid. A briliant blue dyeing of exceptional levelness and penetration on all types of fibers was obtained.

*Example VII*

20 parts of "Ponsol" Brilliant Violet RR Paste were mixed with
70 parts of thickener C. To this were added
10 parts of a solution consisting of 100 parts.  85 parts of diethylene glycol
         15 parts of a propanolamine salt of normal butyl phthalate
         100 parts.

Piece goods containing cotton, viscose rayon, cuprammonium rayon, and barium sulfate delustered viscose rayon fibers were printed with the above printing paste, dried, and aged for five minutes at 216° F. The print was then developed as in Example II. A bright level violet print of exceptional color value and penetration was obtained.

Example VIII 5 parts of "Sulfogene" Fast Black CL (Indocarbon CL) were mixed with
5 parts of glycerin. To this were added
80 parts of thickener B as in Example I and
4 parts of sodium benzyl ortho-phthalate
6 parts of water
___
100 parts Cotton, lustrous rayon, and titanium dioxide delustered rayon were printed with the above printing composition, dried, aged for five minutes at 214° F., and developed as in Example II. A brilliant and uniform print of excellent penetration to the reverse side of the fabric was obtained.

Example IX 5 parts of Indigosol O4B (Leuco sulfuric ester derived from Ciba Blue 2BD—Color Index #1184) were mixed with
5 parts of Cellosolve (ethylene-glycol-monoethyl-ether)
2 parts of cyclohexylamine salt of benzyl phthalate
20 parts of warm water (160° F.) and
58 parts of neutral starch tragacanth thickening.
There were then added
4 parts of ammonium sulfocyanide (50% solution)
4 parts of sodium chlorate (23% solution)
1 part of ammonium vanadate (1% solution)
1 part of ammonia (25% solution)
___
100 parts Starch tragacanth thickening:
100 parts of wheat starch
360 parts of gum tragacanth (6% solution)
540 parts of water
___
1000 parts. Heated at the boil for fifteen minutes, cooled.

Piece goods containing cotton, lustrous and titanium dioxide delustered rayon were printed with the above printing composition, dried, and aged for six minutes in the rapid ager. After aging, the material was rinsed, soaped for five minutes at 160° F. in a 0.5% soap solution, rinsed, and dried. A brilliant level blue dyeing showing exceptional penetration of color to the reverse side of the fabric was obtained.

Example X 20 parts of "Sulfanthrene" Scarlet Y paste (or Ciba Scarlet G paste) were mixed with
45 parts of thickener A. To this were added
25 parts of thickening SBG and
5 parts of sodium benzyl terephthalate
5 parts of water
___
100 parts Lustrous and titanium dioxide delustered rayon piece goods were printed with the above printing composition, dried, aged for five minutes at 214° F., and developed as in Example II. A bright scarlet print showing excellent color value and of very good penetration was obtained, although the percentage of potash and sodium sulfoxylate formaldehyde in the printing composition was lower than is normally employed.

In the above example, sodium benzyl terephthalate may be replaced by sodium benzyl naphthalate with equally good results.

The following example illustrates the preparation of novel dyestuff compositions especially adapted for this invention.

Example XI 100 parts of "Sulfanthrene" Orange R paste (Color Index #1217) were mixed with
30 parts of potassium ethyl phthalate
___
130 parts. There were then evaporated
30 parts of water producing
___
100 parts assistant "Sulfanthrene" Orange R paste.

The above was milled in a colloid mill producing a finely dispersed assistant dyestuff paste adapted for handling in commerce.

Example XII 20 parts of "Sulfanthrene" Orange R paste (Color Index #1217) were mixed with
75 parts of thickener A. There were then added
5 parts of sodium 2-ethylbutyl phthalate
___
100 parts For control purposes, a second printing paste was prepared as above with the exception that 5 parts of water were substituted for 5 parts of sodium 2-ethylbutyl phthalate. Cotton, lustrous rayon and titanium dioxide delustered rayon were printed with the above printing compositions, dried, and aged for five minutes at 218° F. in a rapid ager of the Mather Platt type. The printed material was then treated for forty-five seconds in an oxidizing bath at 140° F. containing 0.5% sodium bichromate and 0.5% acetic acid, rinsed in cold water, soaped for five minutes in a soap bath at 170° F. containing 0.5% soap, rinsed, and dried. The print obtained from the printing paste containing the assistant was stronger, brighter, more uniform, and showed greater penetration to the reverse side of the fabrics than the control print.

The above printing pastes were allowed to stand at room temperature for two weeks in closed containers and were reprinted as described above. The printing paste containing the assistant produced a more noticeable improvement in strength, levelness and penetration over the control print than was observed when the printing pastes were printed immediately after their preparation. The presence of the assistant, therefore, stabilizes the printing paste against deterioration on standing for an appreciable length of time.

Example XIII 15 parts of "Sulfanthrene" Pink FF Paste (Color Index #1211) were mixed with
75 parts of thickener A. There were than added
5 parts of sodium 2,4-dimethyl pentyl phthalate and
5 parts of water
___
100 parts.

Piece goods containing cotton, cellulose acetate, lustrous viscose rayon and titanium dioxide delustered rayon fibers were printed with the above printing composition, dried, aged, and developed as in Example II. A bright print of exceptional uniformity, levelness, color value, and penetration to the reverse side of the fabric was obtained.

Sodium 2,4-dimethyl pentyl phthalate may be substituted by sodium n-hexyl phthalate of sodium 2-ethyl hexyl phthalate with substantially equivalent results.

Example XIV 10 parts of "Sulfanthrene" Blue 2BD Paste (Color Index #1184) were mixed with
50 parts of thickening SBG. To this were added
5 parts of glycerin
10 parts of caustic soda (35%)
10 parts of potash
10 parts of glucose and
5 parts of sodium amyl phthalate 100 parts.

Cotton, lustrous and delustered rayon piece goods were printed with the above printing composition, dried, and aged for seven minutes at 216° F. in a rapid ager. The printed material was then treated for one minute in an oxidizing bath at 140° F. containing 0.5% of sodium bichromate and 0.5% of acetic acid, rinsed in cold water, soaped for five minutes in a soap bath at 160° F. containing 0.5% soap, rinsed and dried. A brilliant blue dyeing was obtained which showed excellent color value, levelness, and penetration of color to the reverse side of the fabric.

Example XV 20 parts of "Ponsol" Jade Green Paste (Color Index #1101) were mixed with
72 parts of thickener A. To this were added
8 parts of sodium diacetone alcohol phthalate 100 parts.

Cotton, lustrous and delustered rayon piece goods were printed with the above printing paste, dried, aged, and developed as in Example II. A bright green print of exceptional strength, brilliancy, levelness, and penetration was obtained.

Example XVI 10 parts of "Ponsol" Blue GD Double Paste (Color Index #1113) were mixed with
70 parts of thickener A. To this were added
10 parts of sodium ethylene glycol monoethyl ether phthalate and
10 parts of water 100 parts.

Cotton and rayon piece goods were printed with the above printing paste, dried, aged, and developed as in Example II. A bright uniform print of excellent penetration was obtained.

Example XVII

The following assistant color paste was prepared:

100 parts of "Sulfanthrene" Orange R Paste (Color Index #1217) were mixed with
25 parts of sodium 2-ethyl butyl phthalate 125 parts. There were then evaporated
25 parts of water forming 100 parts of assistant "Sulfanthrene" Orange R Paste.

In the above formulation, sodium 2-ethyl butyl phthalate may be substituted by the following compounds with substantially equivalent results: sodium butyl phthalate, sodium 2,4-dimethyl pentyl phthalate, sodium N-hexyl phthalate, sodium 2-ethyl hexyl phthalate, sodium amyl phthalate, and sodium mixed alcohol phthalates obtained by the esterification of a mixture of $C_6$ primary and $C_7$ secondary monohydric alcohols (B. P. 133°–150° C.) obtained from the methanol synthesis from CO and hydrogen.

In the above example, "Sulfanthrene" Orange R Paste may be replaced by other vat dyes of the thioindigoid or anthraquinone series, for instance "Sulfanthrene" Red 3B Paste (Color Index #1212), "Sulfanthrene" Blue 2BD Paste (Color Index #1184), "Sulfanthrene" Pink FF Paste (Color Index #1211), "Sulfanthrene" Yellow R Paste (Color Index #1170), "Sulfanthrene" Violet B Double Paste (Color Index #1222), "Ponsol" Dark Blue BR Paste (Color Index #1099), "Ponsol" Jade Green Paste (Color Index #1101), "Ponsol" Blue GD Double Paste (Color Index #1113), "Ponsol" Flavone GC Paste (Color Index #1095), "Ponsol" Yellow G Paste (Color Index #1118), "Ponsol" Blue Green FFB Double Paste (Color Index #1173), "Ponsol" Violet RRD Paste (Color Index #1104), and "Ponsol" Golden Orange G Paste (Color Index #1096).

Example XVIII

An easily dispersible vat color powder suitable for printing and dyeing was prepared as follows:
100 parts of "Sulfanthrene" Orange R Paste (Color Index #1217) were mixed with
25 parts of sodium butyl phthalate
30 parts of British gum and
30 parts of sucrose
15 parts of water 200 parts.

Milled in a colloid mill to produce a smooth paste, evaporated to dryness, and milled the dry mass for eight hours in a rod mill producing an easily dispersible powder. Instead of "Sulfanthrene" Orange R Paste, the colors and assistants mentioned in Example XVII may be employed with equally satisfactory results.

Example XIX

An easily dispersible vat color powder suitable for printing and dyeing was prepared as follows:
100 parts of "Ponsol" Dark Blue BR Paste (Color Index #1099) were mixed with
30 parts of sodium ethyl butyl phthalate 130 parts
Evaporated to dryness and added
15 parts of British Gum and
15 parts of refined glucose The above was mechanically mixed and milled for ten hours in a ball mill producing an easily dispersible powder. Instead of "Ponsol" Dark Blue BR Paste, the colors and assistants mentioned in Example XVII may be employed with equally satisfactory results.

In place of the compounds of the above examples other compounds may be substituted as penetrating agents without departing from the scope of the present invention. For example, the mono-acid esters of phthalic acid and the water-soluble salts thereof with monohydroxy alcohols such as methyl, ethyl, propyl, isopropyl, butyl, isobutyl, secondary butyl, tertiary butyl, amyl, 2-ethyl butyl, 2,4-dimethyl pentyl, n-hexyl, allyl and crotonyl alcohols, geraniol, cyclohexanol, terpineol, and diacetone alcohol. Polyhydroxy alcohols which contain a single free hydroxyl group may be employed as esterification agents to form satisfactory penetrating agents. As examples of the last-mentioned alcohols may be mentioned ethylene glycol monomethyl and ethyl ethers, diethylene glycol monoethyl and monobutyl ethers. The corresponding acid esters and water-soluble salts of isophthalic, terephthalic, naphthalic are also effective for the present purposes.

The hydrocarbon groups above identified may be substituted by halogen such as chlorine, bromine, or hydroxyl or alkyl or aryl groups or lower alkoxy groups such as methoxy, ethoxy, propyloxy, butyloxy groups. As examples of compounds containing such groups, mention is made of trichlorobenzyl phthalic acid sodium salt, alpha, alpha-dimethylbenzyl phthalate ammonium salt, sodium-2,3-dihydroxy-1-propyl phthalate, hydroxy-phenylmethyl phthalic acid, para-ethoxybenzyl phthalic acid triethanolamine salt. It will be noted that certain of the above compounds are water-soluble while others are only water-soluble if present in the form of their salts. Those compounds containing solubilized groups may be neutralized by a cation which does not impair the water-solubilizing tendencies of the solubilized group. Such cations are the alkali metals of sodium and potassium and water-soluble organic bases, and especially those which contain free OH groups or other groups conferring water-solubility. Examples of such organic bases are the mono-, di- or tri-alkylamines, mono-, di- or tri-ethanolamines, the corresponding propanolamines, the butylamines, cyclohexylamine, cyclohexyl mono- or di-ethanolamine, dimethylethanolamine, N-butylamine, guanidine, tetraethyl ammonium hydroxide, glucamine, N-methyl glucamine, diglycerylamine, 1,3-diamino-2-propanol, 1-aminopropyl diol. Other compounds will be apparent to one skilled in the art after a study of this specification.

This invention does not require the use of the above novel assistants exclusively, but on the contrary other assistants of the customary and well known types may be added, and indeed are often very desirable. These subsidiary assistants may be incorporated into the eventual printing paste in any desirable manner. For instance, they may be mixed with the benzyl alcohol of this invention to produce an assistant preparation for the convenient use of the printer, or they may be incorporated by the dye manufacturer directly in the dye preparation, paste or powder to be marketed thus as a color preparation especially suited for printing. Or one of the assistants may be incorporated into the thickening paste or reducing preparation eventually mixed with the dye.

Among these additional or subsidiary assistants may be mentioned wetting and dispersing agents, reducing agents, reducing catalysts, emulsifying agents, lubricants, inert solid or liquid diluents, etc. The individual representatives of these various classes are well known in the art of printing and it will be sufficient for the purpose of illustration to name here but a few typical members, for instance, isopropyl naphthalene sodium sulfonate, diethylene glycol, sodium oleate, pine oil, glucose, sucrose, dextrine, sodium carbonate, sodium hydrosulfite, sodium sulfoxylate formaldehyde, hydroxyalkylamines, tetralin sodium sulfonate, tetralin, hexalin, glycerin, glycol bori borate, etc.

The concentration of these new assistants and their method of application may vary within wide limits, depending on the desired results or convenience. The following general procedure may be used:

(a) Addition of an aqueous solution of the solubilized assistant to the printing composition;

(b) Addition of dry salts of these assistants to the printing composition;

(c) Addition to the printing composition of the dry salts in powder or flake form mixed with sugar, starch or British Gum;

(d) Preparation of an assistant color paste whereby the vat color pigment or leuco sulfuric ester derivative is intimately mixed with an aqueous solution of the salts of these assistants;

(e) Preparation of an assistant color powder whereby the vat color pigment is intimately mixed with a dry salt of any of the above assistants and/or an inert diluent such as sugar, glucose, dextrine, etc.

The proportion of assistant with respect to the weight of the printing paste may likewise vary within wide limits, good results being obtained with proportions from about 0.5 to about 20.0%, depending on the individual assistant used. As a general rule, when amounts falling within the range given, for example from 0.5% to about 5.0% are used, the prints are free from speckiness and are characterized by good and in some cases even excellent penetration. When amounts of about 5% to about 20% are used, the prints are not only uniform, free from speckiness and of exceptional strength and brilliance, but have excellent penetration.

Where these assistants are incorporated into the marketable dye composition, the latter may be prepared in paste form or dry, for instance powder, grains or flakes, with suitable diluents such as glucose, sucrose, dextrine, etc., as most convenient.

This invention has the advantage that vat dye printing compositions may be easily and economically prepared. A further advantage resides in the feature that prints characterized by unusual penetration to the reverse side of the fabric may be easily obtained. A still further advantage resides in the fact that prints which are free from specks, mealy or mottled effects may be obtained on a commercial scale with facility. The advantages gained are noticeably apparent in heavy shades than in light shades. This invention has the still further advantage that unusual penetration of the dye is obtained in printing both lustrous and delustered rayon fabrics.

As many apparently widely different embodiments of this invention may be made without departing from the spirit and scope thereof, it will be understood that we do not limit ourselves to the specific embodiments thereof except as defined in the appended claims.

We claim:

1. A vat dye composition containing a penetrating agent having the general formula: $(R_1OOC)_nR(COOM)_n$ wherein R is an aromatic hydrocarbon radical, $R_1$ is a hydrocarbon radical, M is a member of the group consisting of hydrogen and water-soluble salt-forming groups, and $n$ is an integer not greater than 3, and being further characterized in that R and $R_1$ may contain a substituent taken from the class consisting of halogen, hydroxyl, alkoxy and hydrocarbon.

2. A printing composition containing a vat dye and from about 0.5% to about 20.0% by weight of a penetrating agent having the formula: $(R_1-CH_2OOC)_nR-(COOM)_n$ wherein R is a benzene nucleus, $R_1$ is a radical selected from the class consisting of hydrogen, and hydrocarbon radicals, M is a member from the class consisting of hydrogen, and a water-soluble salt-forming group, and $n$ is an integer less than 4.

3. Process of printing vegetable fibers, which comprises applying to the vegetable fibers a printing paste containing a vat dyestuff and a water-soluble salt of a compound of the general formula:

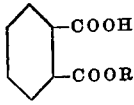

in which R represents an alkyl radical.

4. Process of printing vegetable fibers, which comprises applying to the vegetable fibers a printing paste containing a vat dyestuff and a water-soluble salt of a compound of the general formula:

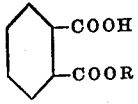

in which R represents a normal butyl radical.

5. A textile printing paste comprising essentially a vat dyestuff, a thickening agent, and a water-soluble salt of a compound of the general formula:

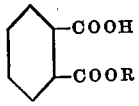

in which R represents a normal butyl radical.

6. Process of printing vegetable fibers, which comprises applying to the vegetable fibers a printing paste containing a vat dyestuff and a water-soluble salt of a compound of the general formula:

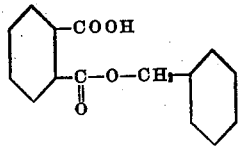

7. A textile printing paste comprising essentially a vat dyestuff, a thickening agent, and a water-soluble salt of a compound of the general formula:

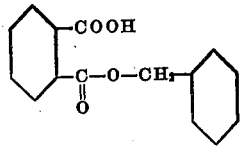

8. A textile printing paste comprising essentially a vat dyestuff, a thickening agent, and a water-soluble salt of a compound of the general formula:

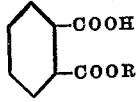

wherein R represents an alkyl radical.

9. A printing composition comprising a vat dye, a thickener and a penetrating agent having the general formula:

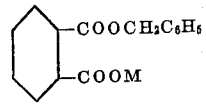

wherein M is a member of the class consisting of hydrogen, and a water-soluble salt-forming group.

10. A printing paste containing a vat dye and sodium benzyl phthalate.

11. A printing composition comprising a vat dye, a thickener and a penetrating agent having the general formula:

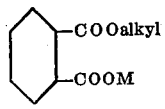

wherein alkyl is a mixture of alkyl radicals having at least six carbon atoms and corresponding to the higher alcohols obtainable from the methanol synthesis, and M is a member of the class consisting of hydrogen, and a water-soluble salt-forming group.

12. A composition as set forth in claim 11 wherein M is an alkali metal.

13. A printing composition containing a vat dye and an alkali metal normal butyl phthalate.

14. In a process of dyeing fabrics, the step which comprises printing a fabric with a printing paste comprising a vat dye and a penetrating agent having the general formula:

$$(R_1OOC)_nR(COOM)_n$$

wherein R is an aromatic hydrocarbon radical, $R_1$ is a hydrocarbon radical, M is a member of the group consisting of hydrogen and water-soluble salt-forming groups, and $n$ is an integer not greater than 3, and being further characterized in that R and $R_1$ may contain a substituent taken from the class consisting of halogen, hydroxyl, alkoxy and hydrocarbon.

15. In a process of dyeing fabrics, the step which comprises printing a fabric with a printing paste comprising a vat dye and a penetrating agent having the general formula:

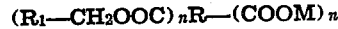

$$(R_1-CH_2OOC)_nR-(COOM)_n$$

wherein R is a benzene nucleus, $R_1$ is a radical selected from the class consisting of hydrogen, and hydrocarbon radicals, M is a member from the class consisting of hydrogen, and water-soluble salt-forming groups, and $n$ is an integer less than 4.

ARTHUR L. FOX.
IVAN F. CHAMBERS.